3,340,255
METHOD OF PREPARING NITROGENOUS STEROIDS

Theodor Wagner-Jauregg and Ludwig Zirngibl, Zofingen, Switzerland, assignors to Siegfried Aktiengesellschaft, Zofingen, Switzerland, a Swiss body corporate
No Drawing. Filed May 5, 1965, Ser. No. 453,500
Claims priority, application Switzerland, May 6, 1964, 5,957/64; Jan. 26, 1965, 1,082/65
11 Claims. (Cl. 260—239.55)

This invention relates to a method of preparing nitrogenous steroids and to novel steroids which may be prepared by said method.

According to one aspect of the invention, there is provided a method of preparing a nitrogenous steroid, wherein a steroid having the partial structure:

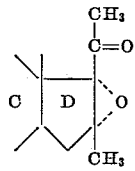

is reacted in a solvent, advantageously ethylene glycol, with a nitrogen compound of the formula:

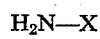

$$H_2N-X$$

wherein X is hydrogen or an optionally substituted aliphatic radical. The aliphatic radical X may be an alkyl radical having 1, 2 or more carbon atoms, and may be substituted by, for example, hydroxy, alkoxy, amino, monoalkyl amino or dialkylamino groups, or halogen atoms.

According to another aspect of the invention there are provided the novel steroids represented by the general formula:

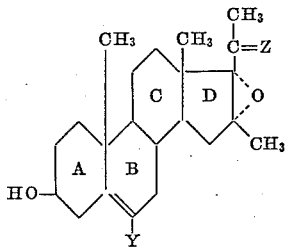

wherein Z is $NHNCH_2CH_2NH_2$, $NCH_2CH_2OH$, $NCH_3$, or $N$-n-$C_4H_9$, and Y is hydrogen.

Further novel steroids which can be prepared by the method of the invention are the isomer of 16β-methyl-16α,17α-oxido-20-imino-Δ⁵-pregnen-3β-ol having a M.P. of 251–253° C., and the 6-methyl homologue of the above defined steroids.

For example, if 16β-methyl-16α,17α-oxido-Δ⁵-pregnen-3β-ol-20-one (Ia) is reacted with ammonia dissolved in glycol, one molecule of $NH_3$ always reacts with one molecule of the sterol with the separation of water. The resulting product having the empirical formula $C_{22}H_{33}NO_2$ with a M.P. of 206–208° C. shows a NMR spectrum indicating that it is the 16β-methyl-16α,17α-oxido-20-imino-Δ⁵-pregnen-3β-ol (structure Ib, cf. table with formula here below). However, the IR spectrum in $CCl_4$ and the data obtained by determination of the active hydrogen content according to Zerewitinoff are not quite in agreement with this interpretation. A 0.04% solution of it in carbon tetrachloride shows in the infra-red in the zone of the NH valence vibration (3300–3500 cm.⁻¹) no absorption, but only a sharp line at 3627 cm.⁻¹ caused without doubt by the free OH group. The determination according to Zerewitinoff indicates 1,3-active hydrogen atoms. The latter results would more easily correspond with an isoxazoline structure as shown here below by the Formula IIa. This substance will be designated hereafter as "Ketimine Ib." It yields with acetic acid anhydride in the presence of triethylamine a monoacetyl derivative having a M.P. of 188–191° C. and with acetic acid anhydride in pyridine a diacetyl derivative having a M.P. of 213–216.5°. With sodium borohydride it may be reduced to a Dihydro-"Ketimine Ib" having a M.P. of 203–205° C. possibly with an isoxazolidine structure according to the Zerewitinoff determination. With butyl lithium and excessive methyl iodide it yields a N-methyl methiodide. From the reaction mixture obtained by the effects of alcoholic hydrochloric acid on "Ketimine Ib," two substances with the empirical formula $C_{22}H_{32}O_3$ having M.P.'s of 238–240° C. and 258–260° C. may be isolated.

By treating the novel epoxide Ig with ammonia dissolved in glycol, one obtains the 6-methyl homologue of "Ketimine Ib," having a M.P. of 199–202° C. the Zerewitinoff determination indicates only 1,4 active hydrogens so that also here an isoxazoline structure may be assumed.

|       | X              | Y    | M.P. (corr.) ° C. |
|-------|----------------|------|-------------------|
| Ia    | O              | H    | 188–190           |
| Ib    | NH             | H    | 206–208           |
| Ic    | $NCH_2CH_2NH_2$ | H    | 161–164           |
| Id    | $NCH_2CH_2OH$  | H    | 193–196           |
| Ie    | $NCH_3$        | H    | 195–196.5         |
| If    | N-n-$C_4H_9$   | H    | 167–169           |
| Ig    | O              | $CH_3$ | 156.5–159       |

A compound isomeric with "Ketimine I$b$" and having the emipirical formula $C_{22}H_{33}NO_2$ with a M.P. of 251–253° C. (designated hereafter as "Isoketimine") is formed by reacting one mol of I$a$ and ethylene diamine in a suitable solvent, e.g. glycol, causing either aminoethanol or water and ethyleneimine to be eliminated.

According to the Zerewitinoff determination, also this "Isoketimine" contains only one active hydrogen atom and represents therefore possibly also an isoxazolino steroid with the partial structure II. It is possibly a spatial isomer of the previously mentioned "Ketimine I$b$" having a M.P. of 206–208° C.

"Isoketimine" cannot be hydrogenated with sodium borohydride. With acetic acid anhydride and pyridine one obtains a monoacetic derivative $C_{24}N_{35}NO_3$ having a M.P. of 249–250.5° C., containing in the IR spectrum an O-acetyl group. After treatment with diluted hydrochloric acid in a suitable solvent, such as tetrahydrofuran, the "Isoketimine" separates ammonia hydrolytically and adds also one molecule of water with the formation of a substance with the empirical formula $C_{22}H_{34}O_4$, having a M.P. of 268–270° C.

If the 16$\beta$-methyl-16$\alpha$,17$\alpha$-oxido-$\Delta^5$-pregnene-3$\beta$-ol-20-one (I$a$) is reacted with an excess of ethylene diamine, one obtains with separation of water the amino ethylimine compound $C_{24}H_{38}N_2O_2$ having a melting point of 161–164° C. and the structural Formula I$c$.

Reaction of I$a$ with ethanolamine yields a substance having a M.P. of 193–196° C. and the empirical formula $C_{24}H_{37}NO_3$ and the probable structure I$d$.

Heating of I$a$ in methylamine yields a reaction product having the empirical formula $C_{23}H_{35}NO_2$, M.P. 195–197° C. with the probable structure I$e$; its monoacetyl derivative melts at 197–198° C. I$e$ may be reduced with sodium borohydride to form the corresponding dihydro compound $C_{23}H_{37}NO_2$, M.P. 204–206° C., yielding with acetylation a diacetyl derivative melting at 118–119° C. When dehydrogenated according to Oppenauer's method, the dihydro compound forms the keto derivative $C_{23}H_{35}NO_2$, M.P. 161–163° C.

The N-n-butyl-imino derivative I$f$, produced in a manner analogous to I$e$, melts at 167–169° C.

The reactions hereinbefore described must be regarded as unexpected, for the reason that epoxy sterols normally react with ammonia under addition with the formation of vicinal aminohydroxy steroids; see H. Pensold, J. Pract. Chem., 20, 331 (1936). Also the 3$\beta$-acetoxy-16$\alpha$,17$\alpha$-oxido-$\Delta^5$-pregnen-20-one reacts with secondary amines under addition of the latter to the epoxy ring: Chem. Abstr. 60, 623 (1964).

The products which may be obtained by the method of the invention are of use as pharmaceutical agents and/or as intermediate products in the manufacture of medicaments. For example Dihydro-"Ketimine I$b$" and the hydrated I$e$ show antiphlogistic properties. For therapeutic use it will be appreciated that the compounds will normally be administered in the form of a pharmaceutical composition comprising the active compound and a pharmaceutically acceptable carrier therefor.

The following non-limitative examples illustrate the invention.

*Example 1*

A mixture of 3 g. (8.7 mM.) of 16$\beta$-methyl-16$\alpha$,17$\alpha$-oxido-$\Delta^5$-pregnen-3$\beta$-ol-20-one (I$a$) and 120 ml. of ethylene glycol which had been saturated at 0° C. with ammonia was heated in a closed glass vessel for 24 hours to 130–140° C. After cooling, further cooling was effected in an ice-salt mixture; the crystallised product was drawn off and yielded 2.5 g. (7.2 mM.) of "Ketimine I$b$," M.P. 205–207° C.; yield 82.5%. After recrystallisation from dioxane, the M.P. rose to 206.5–208° C. $[\alpha]_D^{22} = -65.4°$ (1% $CHCl_3$) $C_{22}H_{33}NO_2$ (343.5): C, 76.92; H, 9.69; N, 408; 0.294 act. H (Zerew.).

Found: C, 77.09; H, 9.72; N, 4.04; 0.40 (1.36 H atoms) IR in KBr 3.15$\mu$ (3$\beta$-OH); 6.15 microns (>C=N—); 10.8–11.0$\mu$ free (no 17-$CH_2$=).

Further product slightly contaiminated with the starting material could be obtained by pouring the mother solution into ten times the amount of water and filtering.

*Monoacetylation.*—750 mg. of "Ketimine I$b$" (2.18 mM.) were suspended in triethylamine and mixed with 8.3 ml. of acetic anhydride. After 40 minutes the substance was fully dissolved, the solution was allowed to stand for 19 hours at 0° C. and then poured into 250 ml. of water. The resulting fine precipitate was extracted with benzene. The extract yielded, after drying over sodium sulphate and concentration, 1.0 g. of material, M.P. 45–52° C. After recrystallisation from benzene there were obtained 155 mg. (19% of the theortical amount) of fine crystals, M.P. 199–201° C. and after repeated recrystallisation 68 mg. of large prism-shaped crystals having a M.P. of 195–198° C. were obtained.

$C_{24}H_{35}NO_3$ (385.6): C, 74.76; H, 9.15; N, 3.63. Found: C, 74.70; H, 9.06; N, 3.64.

The same product was obtained by saponification of the diacetyl derivative of "Ketimine I$b$" with $K_2CO_3$.

*Diacetylation.*—After the addition of 1.5 ml. of anhydrous pyridine and 0.9 ml. of acetic anhydride, 57 mg. of "Ketimine I$b$" were allowed to stand for 20 hours at room temperature and then poured into water. There resulted 52 mg. of a flocculated precipitate having a M.P. of 73–81° C. having after recrystallisation a constant M.P. of 203–205° C.

$C_{26}H_{37}NO_4$ (427.6): C, 73.03; H, 8.72; N, 3.27. Found: C, 73.19; H, 8.98; N, 3.33.

The IR spectrum showed a centre band at 2.95$\mu$ and two strong bands at 5.95 and 6.6$\mu$, indicating the grouping —$NHCOCH_3$.

The reaction of the "Ketimine I$b$" with acetic anhydride under heating for 75 minutes to 105° C. led to identical products from the IR spectrum point of view with melting points of up to 213–216° C.

*Hydrolysis with diluted hydrochloric acid.*—A solution of 100 mg. of "Ketimine I$b$" in 30 ml. of ethanol was mixed with 6 ml. of diluted hydrochloric acid and evaporated in a vacuum. After addition of benzene, evaporation was repeated until dry under reduced pressure. This process was repeated three times. From the 116 mg. residue having a M.P. of 215–217° C. there were obtained, after treatment with decolourising carbon and recrystallisation from methanol, 40 mg. of a substance having a M.P. of 253–255° C. and after repeated recrystallisation 25 ml. of substance having a M.P. of 238–240° C.

$C_{22}H_{33}O_3$ (344.5): C, 76.70; H, 9.36. Found: C, 76.71; H, 9.44.

A second experiment yielded first a crude product with a M.P. of 228–231° C. which rose after recrystallisation from methanol to 258–260° C. Analysis yielded the empirical formula $C_{22}H_{32}O_2$.

These products may possibly be mixtures of 3$\beta$,17$\alpha$-dihydroxy-16-methylene-$\Delta^5$-pregnen-20-one (M.P. 253–255° C.) and 3$\beta$,17$\alpha$-dihydroxy-16-methyl-$\Delta^{5,15}$-pregnadien-20-one (M.P. 275–278° C.). See also Koblicova and Syhora, Collect. Czechoslov. Chem. Commun. 29, 1173 (1964).

*Reduction.*—To a solution of 4.0 g. of "Ketimine I$b$" (11.6 mM.) in 200 ml. of methanol were added at 2° C. 0.44 g. of sodium borohydride, followed by slowly heating to 50° C. and holding this temperature for one hour. After evaporating the clear solution in a vacuum, the residue was dissolved in benzene, scrubbed several times with water, dried over sodium sulphate and evaporated in a vacuum until dry, giving 4.1 g. of residue having a M.P. of 191–194° C. (quantitative yield) which gave after recrystallisation from methanol 3.28 g. crystal clusters, M.P. 203–205° C. (yield 81.5%).

$C_{22}H_{35}NO_2$ (345.5): C, 76.47; H, 10.22; N, 4.06. Found: C, 76.31; H, 10.36; N, 3.86.

In addition, there was found: 1.77% primary amino-nitrogen (Van Slyke-Kainz) and 0.65% active hydrogen (Zerewitinoff), i.e., 2,2 active hydrogen atoms corresponding to a value of 0.293% H calculated for 1 H+.

IR bands in KBr: 2.9 microns.

*Methylation of Dihydro-"Ketimine Ib."*—To a solution of 0.5 g. of Dihydro "Ketimine Ib" (1.5 mM.) in 100 ml. of absolute tetrahydrofuran were added 2.9 mM. of butyl lithium, followed by heating under reflux for 15 minutes under exclusion of moisture. After cooling and adding 4.12 g. of methyl iodide (29 mM.) heating was continued for a further 10 hours under reflux. After evaporation under a vacuum one obtained 1.1 g. of residue which gave after recrystallisation from isopropanol 183 g. of fine felted needles with an M.P. of 226–228° C., and after further recrystallisation 108 mg. of a substance assumed to be 3$\beta$-hydroxy-[17,16-d]-isoxazolidino-2′,3′,16-trimethyl-$\Delta^5$-pregnenmethoiodide in the form of fine needles having a constant M.P. of 245–255° C. (decomposition). Yield 15% of the theoretical value.

$C_{24}H_{40}INO_2$ (501.5): C, 57.48; H, 8.04; N, 2.80; I, 25.31. Found: C, 57.46; H, 8.25; N, 2.79; I, 25.47.

IR bands in KBr: 2.9 microns (3$\beta$-OH); 10.8–11.0$\mu$ free (no 16-$CH_2$=).

*Example 2*

A mixture of 1.0 g. of the epoxide Ia (2.9 mM.) with 0.17 g. of ethylene diamine (2.9 mM.) and 20 ml. of ethylene glycol was heated for 24 hours to 130–140° C. After cooling, the precipitate was filtered off. When poured into water, the filtrate gave an oily deposit. Both products gave after recrystallisation from dioxane in altogether 30% of the theoretical yield fine crystal druses with a M.P. of 251–253° C. (Isoketimine) $\alpha_D^{24}$—26.6° (1% in $CHCl_3$).

$C_{22}H_{33}NO_2$ (343.5): C, 76.92; H, 9.69; N, 4.08. Found: C, 76.92; H, 9.76; N, 4.01.

IR bands in KBr: 2.9$\mu$ (OH, NH); 6.0$\mu$ (—C=N—); 10.80–11.95$\mu$ free (no 16-$CH_2$=); 7.32$\mu$ (16-$CH_3$) only weak. The product was attacked neither by $LiAlH_4$ in boiling ether or by sodium borohydride.

*Monoacetylation.*—100 mg. of the product were dissolved in 2.6 ml. of pyridine and mixed with 1.6 ml. of acetic anhydride. The solution immediately became turbid. After 20 hours standing at room temperature, the gelled mixture was filtered, yielding 95 mg. of a product with a melting point of 233–238° C. After recrystallisation from tetrahydrofuran, the substance was present as a fine crystalline powder with a constant M.P. of 249–250.5° C.

$C_{24}H_{35}NO_3$ (385.6): C, 74.76; H, 9.15; N, 3.63. Found: C, 74.68; H, 9.16; N, 3.72.

IR bands in KBr: 2.95$\mu$, w. (OH, NH), 5.77: 8.0$\mu$ (3$\beta$-acetoxy); 6.05$\mu$ (C=O or C=N intensity only slightly less than in the starting material); 7.32$\mu$, m.-s. (16-$CH_3$); 10.85$\mu$, w.

*Reaction with hydrochloric acid.*—56 mg. of "Isoketimine", M.P. 251–253° C., were dissolved in 20 ml. of abs. tetrahydrofuran, mixed with 3.4 ml. of diluted hydrochloric acid and then evaporated under a vacuum until dry. There remained 62.5 mg. of colourless substance with a M.P. of 265–268° C. This yielded after recrystallisation from methanol fine crystals with a melting point of 268–270° C.

$C_{22}H_{34}O_4$ (362.5): C, 72.89; H, 9.45. Found: C, 73.03; H, 8.94. N— Cl—.

IR bands in KBr, 2.9$\mu$, s. (OH); 5.90$\mu$ s. (CO); 7.40$\mu$, m.-s.; 10.82$\mu$, w.-m.

*Example 3*

A mixture of 2.0 g. of epoxide Ia (5.8 mM.) was reacted with 19.4 g. of ethylene diamine in 80 ml. of ethylene glycol as in Example 1. After pouring into water and centrifuging there were obtained 2.4 g. of an oily precipitate. After recrystallisation from dioxane there resulted 530 mg. (13.7 mM.; 23.6% of the theoretical yield) of fine crystal clusters with a M.P. of 159–163.5° C. having after repeated recrystallisation from dioxane a constant M.P. of 161–164° C. and consisting of 20-($\beta$-aminoethyl)-imino - 3$\beta$-hydroxy-16$\beta$-methyl-16$\alpha$,17$\alpha$-oxido-5-pregnene (Ic).

$C_{24}H_{38}N_2O_2$ (386.6): C, 74.57; H, 9.91; N, 7.25. Found: C, 74.52; H, 9.93; N, 7.58.

IR bands in KBr: 3.00; 3.05$\mu$ ($NH_2$); 6.05$\mu$ (>C=N—)

The bands in the zone between 11.5 and 12.5$\mu$ correspond to the 16$\alpha$,17$\alpha$-epoxy structure of the substance.

*Example 4*

Under the same conditions as in Example 1, 1 g. of epoxide Ia (2.9 mM.) was reacted with 4.9 g. of ethanolamine in 40 ml. of ethylene glycol. After pouring into water, there was obtained 1 g. of a resinous substance. This was chromatographed with neutral aluminium oxide, Akt. III, resulting after evaporation of the acetone eluate in 150 mg. of crude product with a M.P. of 184–197° C. (0.4 mM.; 13.4% of the theoretical yield), giving after recrystallisation from cyclohexane 36 mg. of 3$\beta$-hydroxy-20 - $\beta$ - hydroxyethylimino-16$\beta$-methyl-16$\alpha$,17$a$-oxido-$\Delta^5$-pregnene (Id), M.P. 193–196° C. in the form of fine white clusters.

$C_{24}H_{37}NO_3$ (387.6): C, 74.37; H, 9.62; N, 3.62. Found: C, 74.26; H, 9.60; N, 3.71.

IR bands in KBr: 3.1$\mu$ (3$\beta$-OH, 20-hydroxyethyl); 6.05$\mu$ (>C=N—).

*Example 5*

At a temperature of not more than —18° C., 4.0 g. of epoxide Ia (11.6 mM.) were mixed with 20 g. of anhydrous methylamine and 160 ml. of ethylene glycol and heated in a glass autoclave for 24 hours at 130–140° C. After cooling, the solution was poured into 1.5 litres of water and extracted, leaving a residue of 4.66 g. of a fine, colourless powder having a M.P. of 180–182° C.

After recrystallisation from cyclohexane there were obtained 2.86 g. of fine flakes with a melting point of 195–196.5° C., and from the mother liquor a further 0.55 mg., making altogether 9.55 mM. or 82.3% of the theoretical yield of 3$\beta$-hydroxy-16$\beta$-methyl-20-methylimino-16$\alpha$,17$\alpha$-oxido-$\Delta^5$-pregnene (Ie).

$C_{23}H_{35}NO_2$ (357.5): C, 77.27; H, 9.86; N, 3.92. Found: C, 77.15; H, 9.97; N, 3.85.

$\alpha_D^{22}$—29.9° (1% in $CHCl_3$); no absorption in UV; IR bands in KBr at 2.9$\mu$ (3$\beta$-OH); 6.02$\mu$ (>C=N—); in the range from 10.80 to 10.95$\mu$ no bands.

*Acetylation.*—A solution of 1.0 g. (2.79 mM.) of imine Ie in 26 ml. of abs. pyridine was allowed to stand for 20 hours at room temperature after addition of 16 ml. of acetic anhydride. The mixture was then poured into water, and the resulting fine precipitate was extracted with benzene; the combined extracts yielded, after washing with water, drying with sodium sulphate and evaporating in vacuo, 1.32 g. of a colourless residue, M.P. 141–147° C. This was recrystallised from 10 ml. of benzene and yielded 326 mg. of fine druses, M.P. 190–191.5° C. (0.816 mM.; 29.2% of the theoretical yield). By redissolving there was obtained 3$\beta$-acetoxy-16$\beta$-methyl-20-methylimino-16$\alpha$,17$a$-oxido-$\Delta^5$-pregnene.

$C_{25}H_{37}NO_3$ (399.6): C, 75.14; H. 9.33; N, 3.51. Found: C, 75.26; H, 9.38; N, 3.48.

IR bands in KBr: 5.80; 8.0μ (3-CH₃COO—); 6.05μ (—NRCOCH₃); very weak bands at 10.90μ.

*Reduction.*—To a solution of 3.3 g. (8.9 mM.) of imine Ie in 130 ml. of methanol was added at 0° C. with stirring 350 mg. of sodium borohydride (9.2 mM.) and the mixture was heated with agitation slowly to 50° C. At 15° C. a fine colourless precipitate was formed which redissolved during further heating. The solution was allowed to stand at 50° C. for 5 hours, then the solvent was distilled off in a vacuum, the residue dissolved in benzene, washed with water, dried and the solvent removed. There were obtained 3 g. (8.32 mM.) (93.2% of the theoretical yield) of 3β - hydroxy - 16β - methyl-20-methylamino-16α,17α-oxido-Δ⁵-pregnene in the form of a colourless powder with M.P. 199–201° C. Recrystallisation from ethyl acetate gave fine needles having a M.P. of 204–206° C.

$C_{23}H_{37}NO_2$ (359.55): C, 76.83; H, 10.37; N, 3.89. Found: C, 76.68; H, 10.46; N, 3.96.

IR bands in KBr: 2.95μ (3β-oxy); 3.1μ (NH); the ketimine band is absent.

The preparation of the above-described reduction product from the starting epoxy Ia and methylamine in alcohol by treatment with hydrogen on a Pt surface [analogous to the preparation of 20-methylamino-5-pregnene-3β-ol, see J. F. Kerwin et al., J. Org. Chem., 27 3628 (1962)] was unsuccessful; 90% of the starting product was recovered.

*Acetylation of dihydro-Ie.*—100 mg. (0.28 mM.) of the product obtained from Ie by reduction were dissolved in 2.6 ml. of pyridine and allowed to stand with 1.6 ml. of acetic anhydride for 62 hours at room temperature. The clear mixture was then poured into water and the pasty residue was extracted with benzene; the combined extracts were washed with water and dried with sodium sulphate. After evaporating in a vacuum, there remained 140 mg. of a vitreous residue which crystallized after rubbing with petroleum ether (140 mg.) in bunches of fine needles with a melting point of 110–114.5° C. By evaporating the mother liquor, there were additionally obtained 11 mg. of druses, M.P. 117–118.5° C. (altogether 0.26 mM. or 93% of the theoretical yield). Recrystallisation of the main product from benzine yielded a product having a constant melting point of 117.5–119° C. namely 3β-acetoxy-20-(N-acetyl-N-methyl)-amino-16β-methyl - 16α,17α - oxido-5-pregnene.

$C_{27}H_{41}NO_4$ (443.64): C, 73.10; H, 9.32; N, 3.15. Found: C, 73.42; H, 9.54; N, 3.14.

IR bands in KBr: 5.80; 8.05μ (3β-CH₃COO—); 6.1μ (—NRCOCH₃). Weak to medium bands at 10.90μ, absent in chloroform solution. At 2.9μ weak, wide absorption.

*Dehydrogenation of dihydro-Ie.*—A mixture of 1.5 mg. (4.2 mM.) of the product obtained from Ie by reduction, 1.5 g. of aluminium isopropylate, 42 ml. of abs. toluene and 8.4 ml. of cylclohexanone was heated, protected against moisture, for 2 hours under reflux and then distilled with water vapour. The distillation residue was filtered and the filtering residue dried and boiled repeatedly with methanol. After evaporation under vacuum, the combined extracts gave 1.5 g. of residue, M.P. 133–141° C. Recrystallisation from ethyl acetate yielded 392 mg. of druses, M.P. 163.5–166° C. and concentration of the mother liquor, filtering and recrystallisation gave a further 202 mg. with a similar melting point, altogether 1.66 mM. (40% of the theoretical yield) of 3-oxo-16β-methyl-20-methylamino-16α,17α-oxido-Δ⁴-pregnene.

$C_{23}H_{35}NO_2$ (357.5); C, 77.27; H, 9.87; N, 3.91. Found: C, 77.27; H, 10.14; N, 4.01.

IR bands in KBr: 3.0μ (NH₂); 6.0μ (s.); 6.2μ (m.) (3-oxo-Δ⁴).

*Example 6*

1.7 g. of epoxide Ia were heated with 18.3 g. of pure butylamine in a glass autoclave over 24 hours at 135° C. Filtering off the precipitate formed during cooling yielded 290 mg. of substance in the form of fine flakes with a melting point of 167–169° C. After pouring the filtrate into 700 ml. of water, a fine precipitate formed, which yielded after filtering 1.3 g. of a substance with a M.P. of 153–159° C., giving after recrystallisation from acetone 508 mg. of coarse needles, M.P. 167–169° C. From the mother liquor, a further 384 mg. of the same substance were obtained. The total yield was therefore 1.18 g. (60% of the theoretical yield) of 20-n-butylimino-3β-hydroxy-16β-methyl-16α,17α-oxido-Δ⁵-pregnen (If).

$C_{26}H_{41}NO_2$ (399.6): C, 78.14; H, 10.34; N, 3.50. Found: C, 78.10; H, 10.38; N, 3.61.

IR bands in KBr: 2.9μ (3β-OH); 6.05μ (>C=N).

*Reduction.*—From 1 g. (2.65 mM.) of the butylimino compound If there was obtained, after the reduction according to Example 5, in quantitative yield the dihydro products having a M.P. of 134–137° C., forming after recrystallisation from cyclohexane fine crystal druses with a constant M.P. of 137–139° C.

$C_{26}H_{43}NO_2$ (401.6): C, 77.76; H, 10.79; N, 3.48. Found: C, 77.68; H, 10.79; N, 3.45.

IR bands in KBr: 2.9μ (3β-OH); the ketimine band is missing.

*Example 7*

The starting material, hitherto not described in the literature, was produced by epoxidising 2.9 g. of 3β-acetoxy-6.16β-dimethyl-Δ⁵·¹⁶-pregnadien-20-one by a method analogous to the method of Julian and his coworkers, J. Am. Chem. Soc. 72, 5145 (1950), with alkaline hydrogen peroxide. There were obtained 2.5 g. of crude product, M.P. 148–153° C., yielding after recrystallization from cyclohexane 2.2 g. (81% of the theoretical yield) of 6,16β-dimethyl-16α,17α-oxido-Δ⁵-pregnen-3β-ol - 20 - one (Ig) in the form of fine crystal druses, M.P. 157–159° C.

$C_{23}H_{34}O_3$ (358.5): C, 77.05; H, 9.56. Found: C, 76.75; H, 9.89.

2 g. of this epoxide Ig were heated with 40 ml. of ethylene glycol saturated with ammonia in a steel tube with a glass insert for 24 hours at 130–140° C. By pouring the contents into 400 ml. of water and filtering, there were obtained 2.3 g. of residue, M.P. 84–92° C., yielding after recrystallisation from dioxane 1.1 g. of fine granular crystals with a constant M.P. at 200–202° C. From the mother liquor 0.2 g. of the same material were also recovered, so that the total yield was 1.3 g. (61% of the theoretical yield) of the 6-methyl homologue of "Ketimine Ib."

$C_{23}H_{35}NO_2$ (357.6): C, 77.27; H, 9.86; N, 3.92. Found: C, 76.72; H, 10.02; N, 3.90.

The Zerewitinoff determintaion gave 0.39% H, corresponding to 1.37 active H atoms.

IR bands in KBr: 2.95μ (3β-OH); 6.15μ (>C=N).

We claim:
1. Method of preparing a nitrogenous steroid having a partial structure selected from the group consisting of:

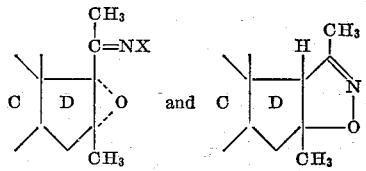

wherein X is selected from the group consisting of hydrogen, lower alkyl radicals and lower alkyl radicals substituted by an amino group or a hydroxy group, which comprises heating in a solvent the corresponding steroid having the partial stricture

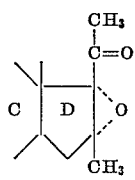

with a compound having the formula H₂N—X wherein X has the same meaning as defined above.

2. Method according to claim 1 wherein the solvent is ethylene glycol.

3. Method according to claim 1 wherein the starting steroid is 16β-methyl-16α,17α-oxido-Δ⁵-pregnen-3β-ol-20-one.

4. Method according to claim 1 wherein the starting steroid is 6-methyl-16β-methyl-16α,17α-oxido-Δ⁵-pregnen-3β-ol-20-one.

5. Method according to claim 1 wherein the starting steroid is reacted with a nitrogen compound selected from ethylene diamine, ethanolamine, methylamine and n-butylamine.

6. Method according to claim 1 wherein the starting steroid is reacted with an equimolecular amount of ethylene diamine.

7. Method according to claim 1 wherein the starting steroid is reacted with an excess of ethylene diamine.

8. Method according to claim 1 wherein the nitrogenous steroid is subjected to an acylation reaction.

9. As novel compounds, the steroids represented by the general formula:

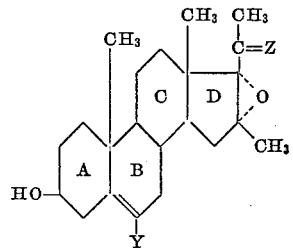

wherein Z is NH, NCH₂CH₂NH₂, NCH₂CH₂OH, NCH₃ or N-n-C₄H₉, and Y is hydrogen.

10. The isomer of 16β-methyl-16α,17α-oxido-20-imino-Δ⁵-pregnene-3β-ol having a M.P. of 251–253° C.

11. The 6-methyl homologue of 16β-methyl-16α,17α-oxido-20-imino-Δ⁵-pregnene-3β-ol having a M.P. of 200–202° C.

No references cited.

LEWIS GOTTS, *Primary Examiner.*

ELBERT L. ROBERTS, *Examiner.*

H. FRENCH, *Assistant Examiner.*